(No Model.) 3 Sheets—Sheet 1.
T. GAUNT.
EVAPORATING APPARATUS.
No. 416,456. Patented Dec. 3, 1889.
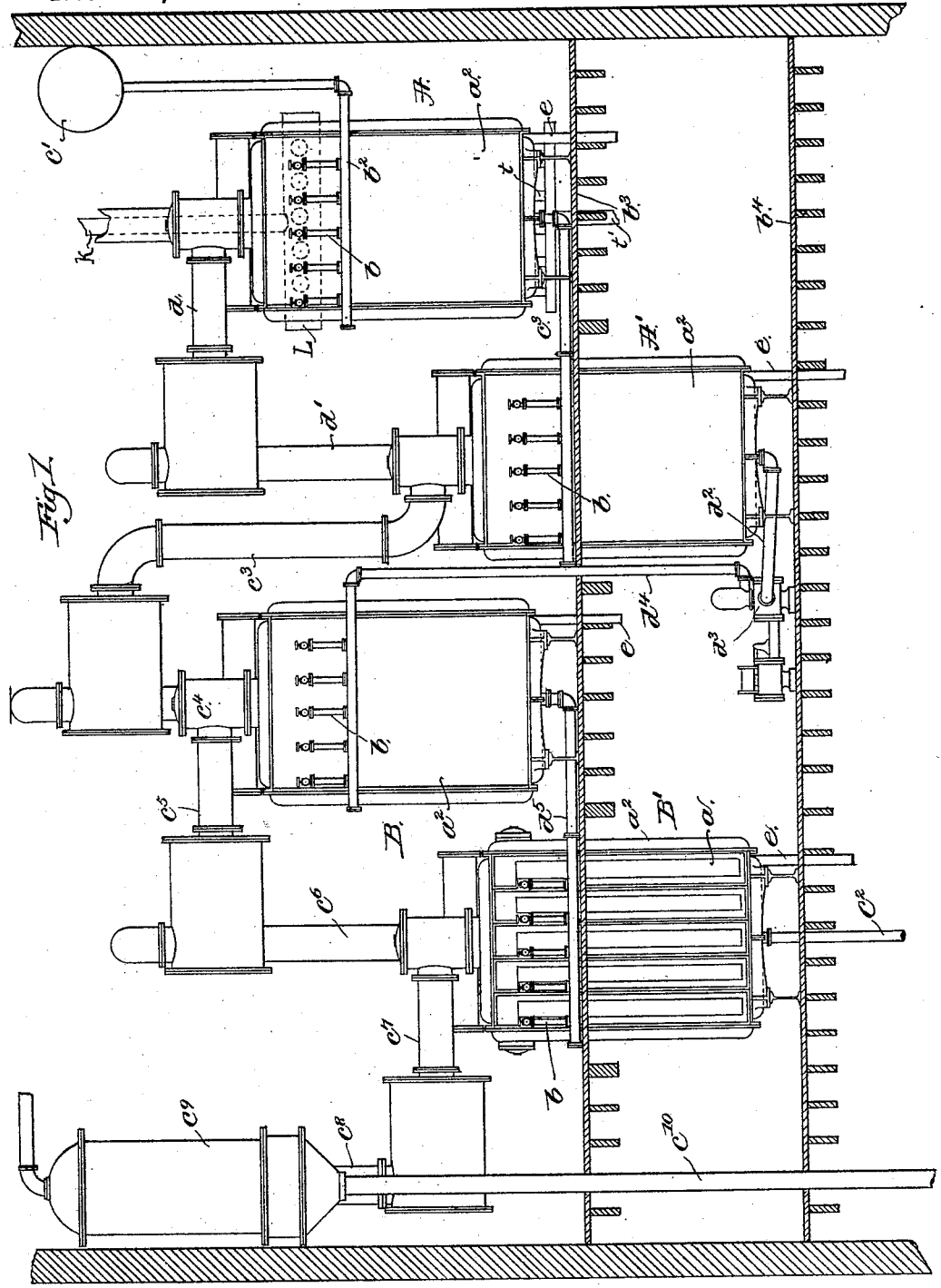

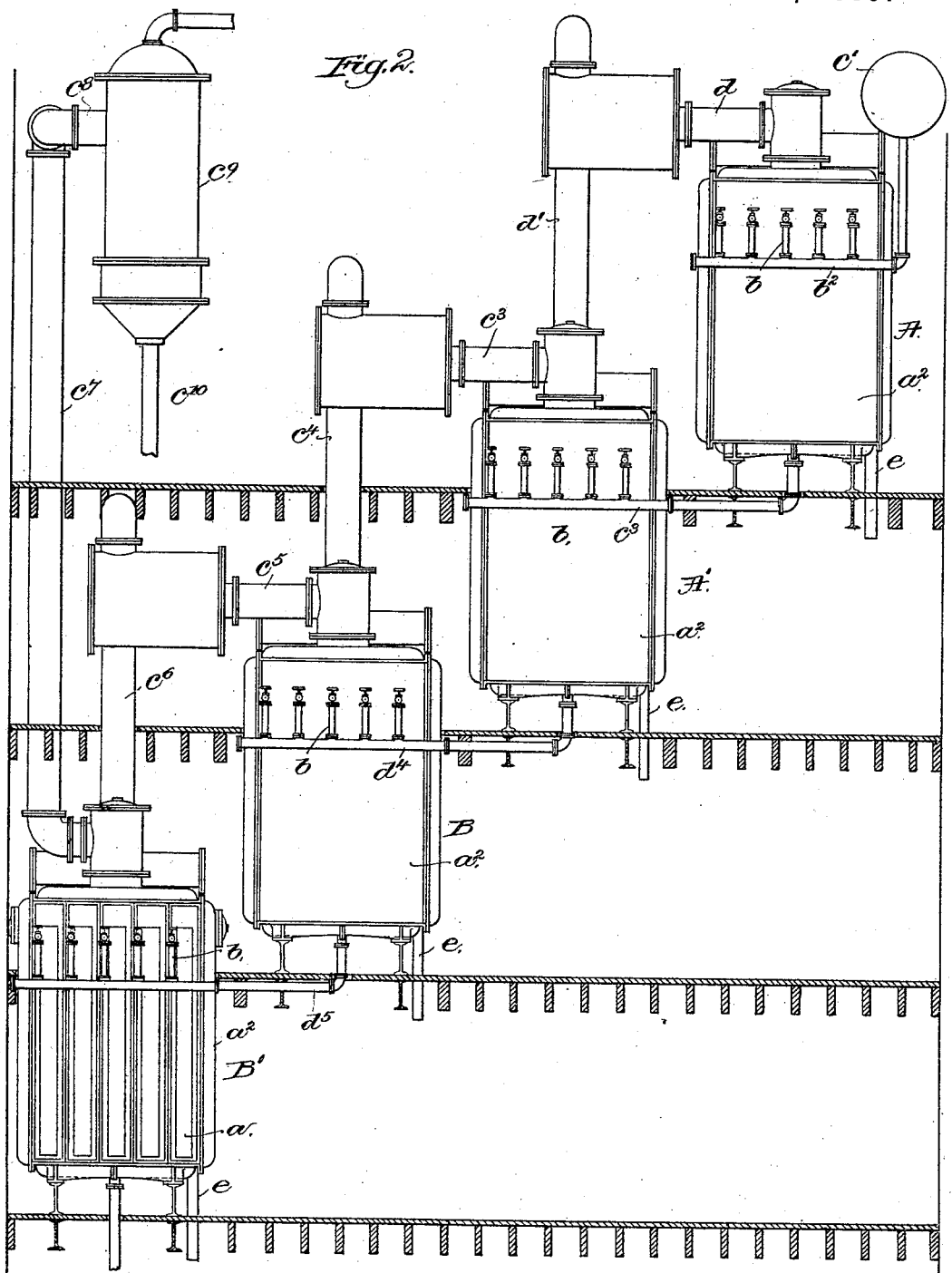

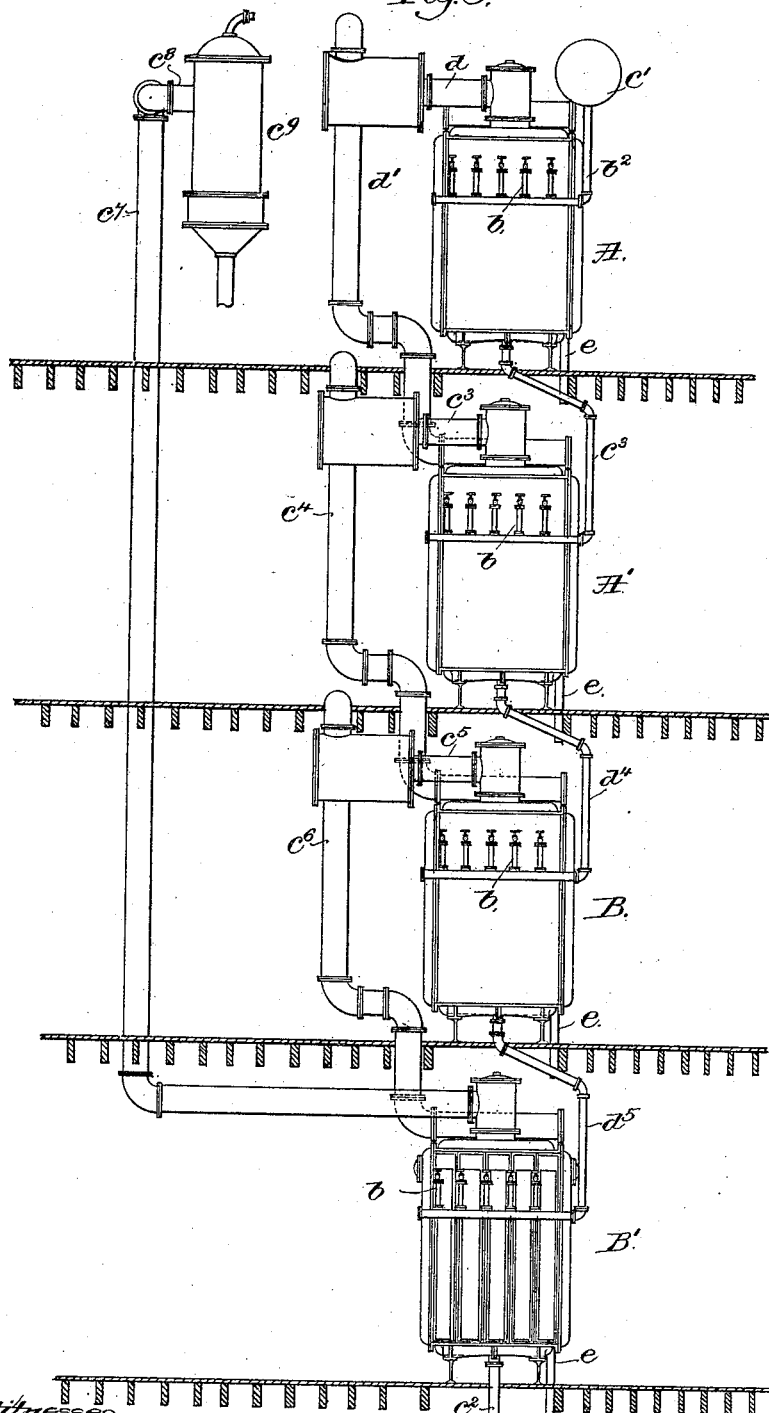

UNITED STATES PATENT OFFICE.

THOMAS GAUNT, OF BROOKLYN, NEW YORK.

EVAPORATING APPARATUS.

SPECIFICATION forming part of Letters Patent No. 416,456, dated December 3, 1889.

Application filed September 10, 1888. Serial No. 285,013. (No model.)

*To all whom it may concern:*

Be it known that I, THOMAS GAUNT, of Brooklyn, county of Kings, State of New York, have invented an Improvement in Evaporating Apparatus, of which the following description, in connection with the accompanying drawings, is a specification, like letters on the drawings representing like parts.

This invention relates to evaporating apparatus of that class in which the liquid in small quantity or volume is subjected to heat.

In another application, Serial No. 258,655, filed by me December 22, 1887, a series of two or more apparatus arranged to produce a multiple effect and located on substantially the same level are connected by an intermediate pump, by which the concentrated liquid or substance which has passed over the evaporating-surface of one apparatus is pumped to the top of the next apparatus to pass or flow down over the evaporating-surface of the said second apparatus.

My present invention has for its object to construct the evaporating apparatus, when arranged for multiple effect, so that a more even and steady flow of the small volume of liquid on the evaporating-surface is obtained, and so that one or more of the pumps referred to may be dispensed with, thereby effecting a very considerable reduction in the cost of construction and maintenance of the evaporating apparatus.

In accordance with my invention the series of two or more apparatus, which may be arranged to produce a double, triple, quadruple, or other multiple effect, is arranged in gradation—that is, adjacent apparatus are on different levels—so that the concentrated liquid or substance from one apparatus may flow or run down continuously in small volume into the next lower apparatus of the series, a liquid seal or trap being interposed between a higher and a lower evaporator in the conveying-pipe.

The invention consists in an evaporating apparatus, a series of evaporators arranged in gradation and each comprising an evaporating-surface and an enveloping-shell, a liquid-supply connected to the highest evaporator of the series to supply weak liquor to the said highest evaporator, a source of heat connected to the highest evaporator, a pipe connecting the enveloping-shell of a higher evaporator to the evaporating-surface of a lower evaporator, and a liquid-conveying pipe connecting a higher evaporator to the liquid-supply of a lower evaporator, the said liquid-conveying pipe being so constructed and joined to the liquid-supply of a lower evaporator as to form a liquid seal, and thereby maintain the difference in vacuum between the said evaporators.

Figure 1 shows a series of four evaporating apparatus for producing a quadruple effect, the said apparatus being arranged in pairs connected by a pump. Fig. 2 shows the series of four apparatus arranged obliquely in gradation, and Fig. 3 shows the series of four apparatus arranged vertically over each other.

Referring to Fig. 1, each evaporating apparatus A A' B B', which may be substantially such as shown and described in the application referred to, is composed of a number of sections $a$, located in an enveloping-shell $a^2$, each of the said sections (there being five in each shell, as herein shown) forming an evaporating-surface. The evaporating-surfaces of each apparatus are supplied with the liquid or substance to be evaporated in small quantity or volume by branch pipes $b$, which are connected to the source of supply by pipe $b^2$.

The evaporating apparatus A A' B B' are arranged, as shown in Fig. 1, in pairs, the apparatus A B being sustained by a suitable supporting-frame $b^3$ above the apparatus A' B', which are sustained by a supporting-frame $b^4$, which frames may be floors of a building.

The evaporating apparatus A is connected by pipe $b^2$ to the supply-tank $c'$, and the liquid or substance in said tank is supplied to the evaporating-surfaces of the apparatus A by the pipe $b^2$ and branch pipes $b$, the said liquid running over the evaporating-surface in small volume or quantity.

The evaporating-surface in the apparatus A is heated by steam or other agent admitted into each evaporating-surface of the said apparatus through the pipe $k$, connected to a boiler or other suitable generator, and through the manifold L, having branch pipes, (indicated by dotted lines the same as described in the application referred to, wherein the same parts are indicated by like letters.)

The liquid which has flowed or run over the evaporating-surfaces in the apparatus A is conducted therefrom by the pipe $c^3$, forming the supply-pipe for the apparatus A'.

The steam and other products of evaporation from the apparatus A are conducted, as herein shown, by pipes $d$ $d'$ to the apparatus A', the said pipe $d'$ being connected to the interior of the evaporating-surfaces of the apparatus A', the said steam forming the heating agent or medium by which the liquid flowing over the evaporating-surface of the apparatus A' in small volume or quantity is evaporated.

The concentrated liquid in the apparatus A', as shown in Fig. 1, is conveyed from the said apparatus by a pipe $d^2$, connected to a pump $d^3$ of ordinary construction, which elevates the partially-concentrated liquid up through the pipe $d^4$ to the apparatus B, the pipe $d^4$ forming the supply-pipe for the apparatus B.

The liquid or other substance concentrated by its passage over the evaporating-surfaces of the apparatus B is conducted from the said apparatus by the pipe $d^5$ and branch pipes $b$ into the apparatus B' and passes down over the evaporating-surfaces of said apparatus, it being conducted therefrom by the pipe $c^2$.

The steam and other products of evaporation from the apparatus A' form the heating agent or medium for the apparatus B, into which it is conducted by pipes $c^3$ $c^4$, and the products of evaporation from the apparatus B form the heating agent for the apparatus B', into which they are led by the pipes $c^5$ $c^6$, and the products of evaporation from the apparatus B' are conducted by pipes $c^7$ $c^8$ to a condenser $c^9$ of any usual or well-known construction, from which the products of condensation are conducted by pipe $c^{10}$.

Each apparatus is provided with an outlet-pipe $e$, communicating with the interior of the evaporating-surfaces of the said apparatus, by which the condensed vapors are conducted away.

If desired, the apparatus may be arranged in gradation, as shown in Fig. 2, or in a row vertically over one another, as in Fig. 3, and when thus arranged the pump $d^3$ may be dispensed with; but when it is desired to economize in height the apparatus will be preferably arranged as shown in Fig. 1.

When the apparatus arranged as shown in Figs. 2 and 3 is once started, and the cocks or valves in the supply-pipes adjusted to regulate the flow of liquid—that is, to permit the desired amount of liquid to flow over the evaporating-surfaces of each apparatus—the apparatus requires no further attention so long as the supply is maintained.

As herein shown, the outlet of one apparatus is substantially on a line with the supply of the next lower apparatus in the series; but when working under a vacuum, as would be the case with the apparatus herein shown, the outlet of one apparatus may be below the supply to the next lower apparatus of the series, the difference in vacuum compensating for the difference in level.

It will be noticed that in the operation of my apparatus arranged in gradation the heating agent of the highest temperature is admitted into the first apparatus of the series to which the weakest or least concentrated liquor is supplied, and that in the succeeding apparatus of the series, as the liquor becomes more and more concentrated, it is subjected to a correspondingly lower temperature or heat. This method of regulating the temperature of the heating agent to correspond to the concentration of the liquor being treated is of very vital importance when certain liquors or substances are being treated in small volume or quantity—as, for instance, when saccharine juices are being concentrated—for if the arrangement of heating agent and supply of liquor be reversed as practiced when the liquid to be evaporated is in bulk—that is, contained in a pan or vessel in a considerable volume—the resulting concentrated saccharine juices would be materially damaged by the formation of caramel and invert sugar, both of which are commercial impurities in the manufacture of crystalline sugar. Furthermore, it will be noticed that the liquor in small volume or quantity flows continuously from a higher to a lower apparatus of the series.

When evaporators constructed to treat the liquid in small quantity or volume are arranged in gradation, it is necessary to form a liquid seal between connected evaporators, for if this precaution be not taken the degree of vacuum would be the same in the different evaporators, and practically there would be formed one evaporator divided into parts.

The liquid seal referred to is formed in the present instance in and by the vertical branch pipes $b$. It will be seen that the vertical branch pipes must be filled with liquid before the liquid can be discharged into a lower evaporator, and consequently a liquid seal is formed and maintained between a higher and lower evaporator, and the difference in vacuum is thus maintained intact. This liquid seal might be otherwise formed.

I claim—

In an evaporating apparatus, a series of evaporators arranged in gradation and each comprising an evaporating-surface and an enveloping-shell, a liquid-supply connected to the highest evaporator of the series to supply weak liquor to the said highest evaporator, a source of heat connected to the highest evaporator, a pipe connecting the enveloping-shell of the higher evaporator to the evaporating-surface of the lower evaporator, and a liquid-conveyer connecting a higher evaporator to the liquid-supply of a lower evaporator and constructed to afford a liquid seal between them to thereby maintain a difference in vacuum between the said evaporators, substantially as described.

In testimony whereof I have signed my name to this specification in the presence of two subscribing witnesses.

THOMAS GAUNT.

Witnesses:
JAS. H. CHURCHILL,
G. W. GREGORY.